Aug. 17, 1971 J. H. GERMER 3,600,277
REFUELING APPARATUS AND METHOD FOR FAST REACTORS
Filed Oct. 2, 1968 2 Sheets-Sheet 1
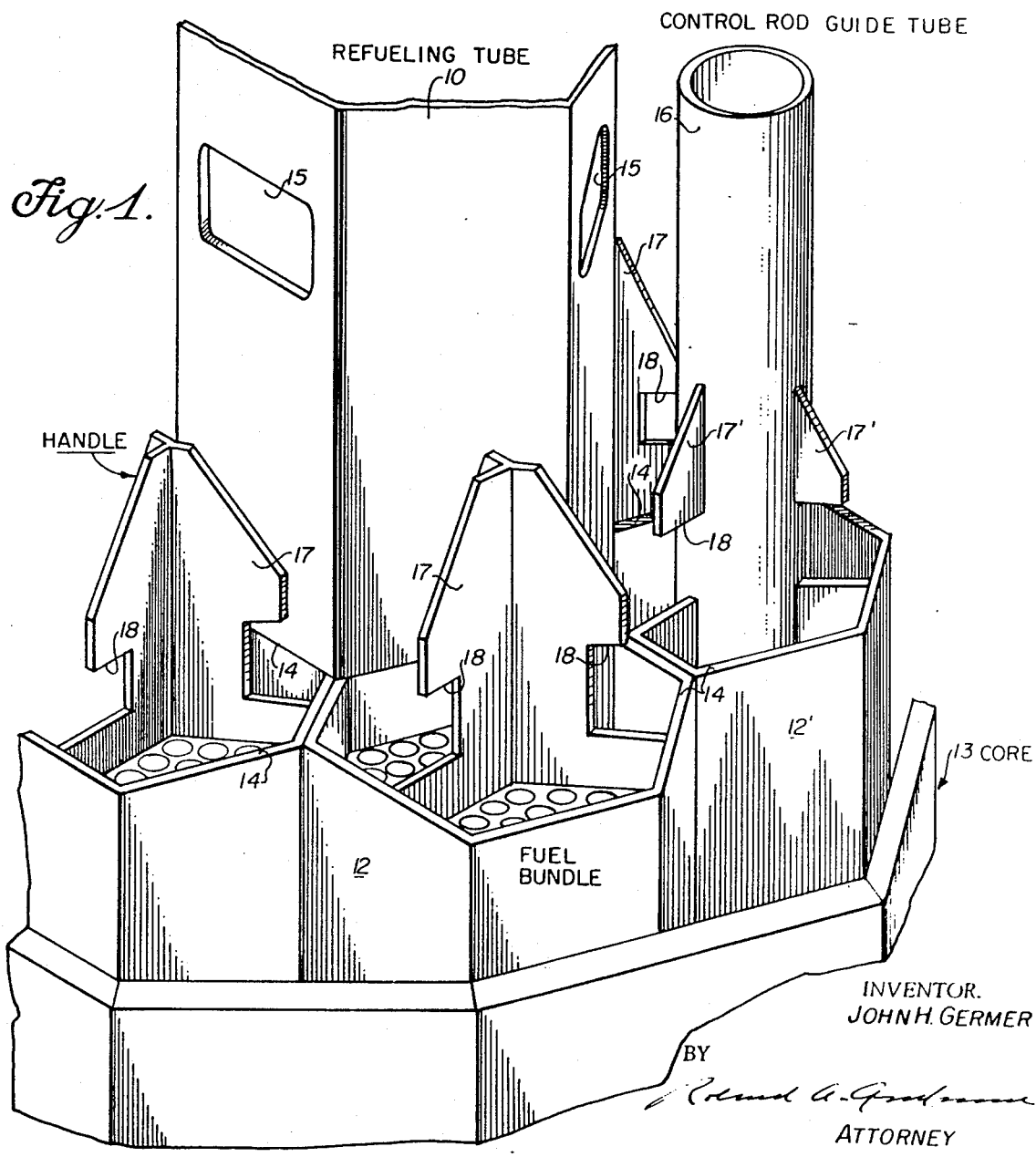
INVENTOR.
JOHN H. GERMER
BY
ATTORNEY

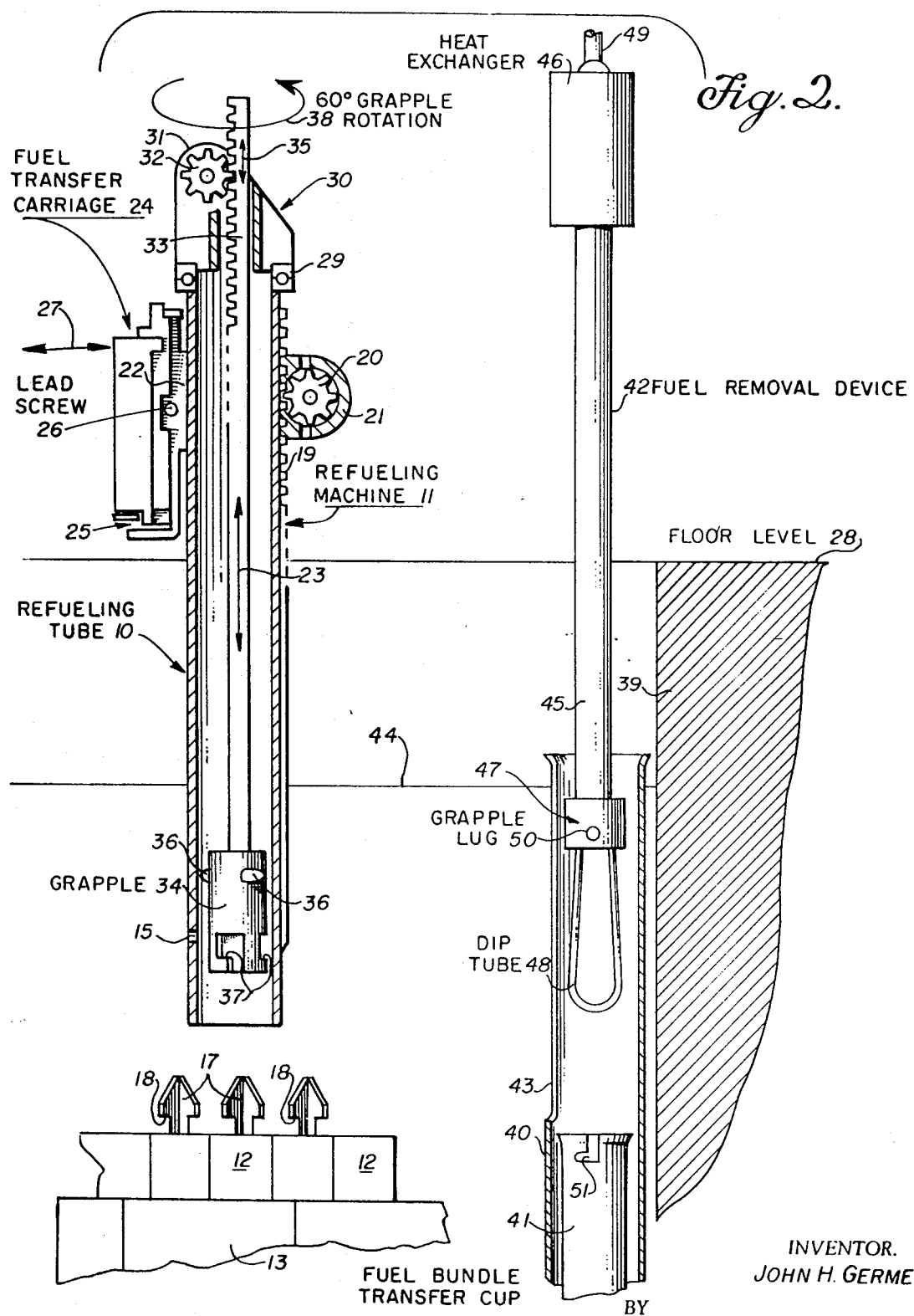

United States Patent Office 3,600,277
Patented Aug. 17, 1971

3,600,277
REFUELING APPARATUS AND METHOD FOR
FAST REACTORS
John H. Germer, San Jose, Calif., assignor to the United
States of America as represented by the United States
Atomic Energy Commission
Filed Oct. 2, 1968, Ser. No. 764,477
Int. Cl. G21c 19/10, 19/20
U.S. Cl. 176—31    7 Claims

ABSTRACT OF THE DISCLOSURE

An apparatus and method for transferring fuel bundles in and out of the core of a sodium-cooled fast reactor, utilizing an inert gas filled refueling cell above the reactor and a removable shield plug between the reactor and the refueling cell. Fuel handling is accomplished by a refueling apparatus consisting of two mechanisms, one of which takes fuel bundles between a storage area and a temporary position adjacent to the reactor, and the other transfers fuel between this temporary position and the reactor core while maintaining the fuel elements submerged in the sodium coolant for permitting continuous removal of decay heat therefrom.

BACKGROUND OF THE INVENTION

The invention described herein was made in the course of, or under, Subcontract W-31-109-38-1997 under Contract No. W-31-109-ENG-38 with the United States Atomic Energy Commission.

This invention relates generally to nuclear reactors, particularly to equipment for handling nuclear fuel elements, and more particularly to an apparatus and method for refueling a nuclear reactor.

In any nuclear reactor which is intended to operate over an extended period of time, such as a reactor which is to be utilized for the generation of electrical power, the reactor facility should be constructed for removal and disposal of used or "spent" fuel elements and for recharging or refueling of the reactor with new or unused fuel elements. Such installations preferably include reactor vessels having one or more access ports enabling insertion and removal of fuel elements and other equipment. In addition, temporary storage facilities should also be provided for new fuel elements which are to be loaded into the reactor and for "spent" fuel elements which are removed from the reactor.

In general, some of the problems associated with charging of fuel elements into a reactor include preventing exposure of the surrounding environment to contaminated gases or particles incident to opening of the reactor, either to remove or replace a fuel element, and incident to loading or unloading of a fuel element at a storage area, shielding of either new or "spent" fuel elements during transportation between the reactor and associated storage areas so as to substantially prevent radiating the surrounding environment.

Much prior effort has been directed to solving the above problems as exemplified by U.S. Patent Nos. 3,137,397 and 3,169,910. While the prior effort has produced satisfactory approaches to these problems, it has not fully solved them, particularly with respect to sodium-cooled fast reactors which should be refueled by an apparatus which operates in an environment of liquid sodium and an inert gas such as argon.

SUMMARY OF THE INVENTION

The present invention overcomes the prior art nuclear reactor refueling problems, specifically with respect to sodium-cooled fast reactors wherein the fuel bundles are removed from the reactor core in a manner which permits continuous removal of large amounts of decay heat, this being accomplished by maintaining the fuel bundle immersed in liquid sodium throughout the transfer operations. In addition, since sodium is not transparent, the inventive apparatus includes means for assuring that the desired operations are reliably carried out, and that accidental withdrawal of other fuel bundles will not occur in the event that adjacent fuel bundles stick together.

Therefore, it is an object of this invention to provide an apparatus and method for refueling a nuclear reactor.

A further object of the invention is to provide a refueling apparatus and method for sodium-cooled fast reactors.

Another object of the invention is to provide a refueling apparatus and method for sodium-cooled fast reactors wherein the fuel bundles or elements are removed from the reactor core in a manner which permits continuous removal of large amounts of decay heat.

Another object of the invention is to provide a refueling apparatus and method which is carried out with the fuel bundle or element immersed in liquid sodium throughout the transfer operations.

Another object of the invention is to provide a refueling apparatus and method which utilizes a temporary storage position adjacent the reactor core and fuel bundle transfer cups in transferring the fuel bundles between an external storage area and the temporary storage position.

Another object of the invention is to provide an apparatus for refueling sodium-cooled fast reactors which includes a refueling portion and a fuel removal portion and wherein each of the apparatus portions maintain the fuel bundle immersed in liquid sodium during the transfer operations.

Another object of the invention is to provide an apparatus for refueling nuclear reactors which includes means for reliably securing the apparatus to the fuel bundles due to the nontransparency of the liquid metal coolant about the fuel bundles and for preventing accidental withdrawal of other fuel bundles which might occur in the event of the sticking of fuel bundles together.

Other objects of the invention will become readily apparent from the following description taken in conjunction with the accompanying drawings wherein:

BRIEF DESCRIPTION OF THE DRAWINGS

FIG. 1 is a perspective view of a portion of the top of a reactor core containing a multitude of fuel bundles or elements with the refueling tube of the inventive apparatus positioned over one of such fuel bundles; and FIG. 2 is a view, partially in cross-section, of a portion of a nuclear reactor showing the inventive refueling apparatus, with portions of the apparatus being omitted for clarity.

DESCRIPTION OF THE INVENTION

A sodium-cooled fast reactor must be refueled by an apparatus which operates in an environment of liquid sodium and an inert gas such as argon. Fuel bundles must be removed from the reactor core in a manner which permits continuous removal of large amounts of decay heat. For this reason, these operations are normally carried out with the fuel bundle immersed in liquid sodium throughout the transfer operations. Since sodium is not transparent, the fuel bundle (except possibly for its handle) is not visible during refueling, and some method must be utilized which assures that the desired operations are reliably carried out. There must also be total assurance that accidental withdrawal of other fuel bundles would not occur in the event of sticking of the fuel bundles together.

The core of such a sodium-cooled fast reactor that must be refueled has the following general characteristics:

(1) Fuel bundles, for example, are hexagonal with a dimension across the flats of about 5 inches, and a total length of about 8 feet.

(2) Fuel bundles touch each other during operation.

(3) Normally, sodium enters the lower end of the fuel bundle, is heated, and is discharged through the upper end into a plenum approximately 10 feet deep, this plenum discharging to heat exchangers.

(4) Some of the fuel bundles contain centrally located control rods surrounded by fuel. These control rods are withdrawn in an upward direction by control drive mechanisms located on a removable shield plug above the sodium outlet plenum. Control rod guide tubes project approximately 2 feet above the tops of the fuel bundles, and are part of the fuel bundles.

(5) All fuel bundles are prevented from upward motion during operation by a hold-down grid suspended from the bottom of the removable shield plug.

(6) The core of the reactor, for example, is made up of approximately 265 fuel bundles, of which approximately 31 contain control rods. The core is surrounded by a radial blanket made up, for example, of approximately 186 bundles similar to fuel bundles and which must be refueled. The radial blanket is surrounded, for example, by a row of approximately 78 hexagonal reflector bundles which also serve as the edge structure for the core.

The above described exemplary reactor core presents specific requirements for a refueling apparatus therefor, the following being a listing of such requirements:

(1) Pick up fuel bundle and transfer between core and fuel bundle transfer cup.

(2) Make transfer with fuel bundle totally submerged under sodium.

(3) Prevent lifting of adjacent fuel bundles when lifting a fuel bundle from the core.

(4) Assure accurate alignment of mechanism to fuel bundle without excessively stringent requirements for precision of the mechanism.

(5) Avoid complicated moving parts under sodium.

(6) Prevent accidental droppage of a fuel bundle.

(7) Retract mechanism completely to above refueling cell floor to permit horizontal traverse to clear shield plug, and to permit use of other mechanisms for removal of fuel bundles to a decay tank.

(8) Permit easy servicing of mechanism by providing for disassembly into long but otherwise compact components which can be removed from the refueling cell through an air lock.

(9) Pick up in addition to regular fuel bundles:

(a) Fuel bundles containing control rods and having a vertical control rod guide tube extension.
(b) Radial blanket bundles.
(c) Radial reflector bundles.

The novel refueling apparatus and method described hereinafter and illustrated in FIGS. 1 and 2 satisfies all of the above stated requirements for sodium-cooled fast reactors. As shown in FIG. 1, a hexagonal refueling tube 10 of the refueling machine portion of the overall apparatus and generally indicated at 11 in FIG. 2 is positioned intermediate hexagonal fuel bundles 12 for removal of replacement of a fuel bundle about which tube 10 is positioned. Fuel bundles 12 are positioned in a reactor core indicated at 13 in a manner known in the art. Note that tube 10 is positioned on the flats or wall channels 14 of the adjacent fuel bundles 12, while allowing the fuel bundle therein to be readily moved within the tube 10. Refueling tube 10 is provided with three cutouts 15 (only two shown) to permit grapple rotation as described hereinafter. One of fuel bundles indicated at 12', for purpose of illustration, is provided with a central control rod mechanism mounted within a control rod guide tube 16 which extends upwardly a greater distance than the other illustrated fuel bundles. Each of fuel bundles 12 are provided with a handle 17 to which the grapple within tube 10 is secured as described below. Handles 17, in this embodiment, are of a triangular configuration having notches 18 therein by which the fuel bundle 12 is secured to the grapple within refueling tube 10. The handle of fuel bundle 12' as indicated at 17' differs from that of the remaining fuel bundles 12 due to the positioning of the control rod guide tube therein, but functions for the same purpose as handles 17.

Referring now to FIG. 2, the refueling machine 11 comprises, in addition to refueling tube 10, a toothed rack 19, secured to tube 10, which meshes with a pinion 20 driven by a prime mover 21, such as an electric motor, which is mounted on a tube carriage 22, tube 10 being movably secured to tube carriage 22 such that it can be moved vertically as indicated by the double arrow 23 for raising and lowering same with respect to fuel bundles 12. Tube carriage 22 is movably mounted on a fuel transfer carriage 24 with transfer carriage 24 being movable mounted on and driven by appropriate support and driving mechanism described hereinafter. Tube carriage 22 is mounted on transfer carriage 24 by a track assembly generally indicated at 25, which may be of the sliding or rolling type as known in the art, and is moved along track assembly 25 by a lead screw 26 driven by a prime mover via appropriate gearing, not shown. The tube carriage 22 is moved by lead screw 26 in a horizontal direction perpendicular to the movement of tube rack 19 and perpendicular to (into and out of the drawing as shown) the direction of movement of the fuel transfer carriage 24, transfer carriage movement being indicated by the double arrow 27. The support and driving mechanism, not shown, for fuel transfer carriage 24 may be similar in construction to that of track assembly 25 (slide or gear type) and lead screw 26 with the cooperating portion of the track assembly, not shown, being fixedly secured on floor level 28 or other support and the lead screw drive being driven by a prime mover, not shown. Since carriage assemblies of the type indicated at 22 and 24 are widely known and used in the art, and since this invention is not based on any specific type of such carriage assembly, it is believed that a detailed description thereof is unnecessary to describe the present invention. Mounted at the upper end of refueling tube 10 via a bearing assembly 29 is a grapple carriage assembly 30 which includes a prime mover 31, such as an electric motor, which drives a pinion 32, which cooperates with a toothed rack or rod 33 secured at one end to a fuel bundle lifting grapple 34. Rotation of pinion 32 causes movement of rack 33 in a vertical direction for moving grapple 34 up and down as indicated by the double arrow 35. Grapple 34 is provided with three (only two shown) projections or lugs 36 which are adapted to extend through cutouts 15 in refueling tube 10 to allow the grapple to rotate (about 60°) for securing same to a handle 17 of a fuel bundle 12 via cutaway sections 37 in the lower end of grapple 34 which are positioned beneath the notches 18 in fuel bundle handle 17 upon rotation of the grapple about 60° in a counter-clock direction as indicated by arrow 38. Note that grapple 34 is of sufficient length to allow the control rod guide tube 16 to extend thereinto when the cutaway section 37 thereof are positioned beneath notches 18 of handle 17' of fuel bundle 12', see FIG. 1. Grapple carriage assembly 30 may be rotated about the tube 10 by appropriate gearing driven by prime mover 31, as known in the art, or by other suitable means. Again, the invention is not directed to the specific grapple carriage assembly and drive therefor, and thus the details thereof are deemed unnecessary.

Positioned between the internal surface of a reactor vessel 39 and the periphery of the core 13 is a storage tank 40 which functions as a temporary storage facility for fuel bundles 12 which are stored therein in oval shaped fuel bundle transfer cups 41 (only one shown) for moving the fuel bundles between tank 40 and an external decay tank, not shown, by a fuel removal device portion of the overall refueling apparatus and generally indicated at 42. Transfer cups 41 are also utilized to transfer a new fuel bundle from an external storage area to the temporary storage tank 40 for removal therefrom by refueling machine 11 for placement thereof in core 13 as will be described in greater detail hereinbelow. Note that tank 40 is provided with a cutout section 43 which allows movement of fuel bundles 12 between tank 40 and core 13 while maintaining the fuel bundles beneath the coolant (sodium) level 44 contained by vessel 39. Temporary storage tank 40 extends above the sodium level 44 for indexing purposes described below.

Fuel removal device 42 functions to transfer fuel in cups 41 between the reactor vessel 39 and a sodium-filled decay tank, not shown, as well as between a new fuel storage pit, not shown, and the reactor vessel 39, and comprises a vertically extending member or column 45, a natural convection NaK (sodium-potassium) member to argon heat exchanger 46 secured at the upper end of column 45 and a grapple 47 secured at the lower end thereof, with a NaK (sodium-potassium) dip tube 48 extending below grapple 47 and in heat exchange relation with heat exchanger 46 through column 45 as described in greater detail hereinafter. Fuel removal device 42 includes a hoist mechanism, not shown, which is attached to column 45 at the upper end thereof by cable 49, whereby the column and associated equipment can be rotated, raised, lowered and moved as required. Grapple 47 is provided with a pair of projections or lugs 50 which are adapted to engage the lower surface of a ledge 51 at the upper end of the transfer cup 41, this being accomplished due to the oval cross-sectional configuration of the cup 41 and by partial rotation of grapple 47 such that when the grapple is partially rotated in one direction the lugs 50 thereof are allowed to be lowered past the ledge 51 of the cup 41 and further rotation or reverse rotation of the grapple causes the lugs 50 to be positioned beneath ledge 51 for raising cup 41 upon upward movement of grapple 47. Like grapple 34, grapple 47 may be hollow or provided with a recess in the center thereof which allows it to fit over the upper end of a control rod guide tube 16.

Fuel bundle transfer cup 41 is closed at its lower end and is of sufficient size to accommodate one fuel bundle 12, as well as one or more NaK dip tubes 48. For example, the cup 41 has about a 6 inch by 10 inch oval cross-section to accommodate a 5 inch fuel bundle and one NaK dip tube on each side of the fuel bundle.

A "spent" fuel bundle 12 at the time of refueling may generate, for example, as much as 50 kilowatts of decay heat. For this reason it must be continuously immersed in liquid sodium, for example, until a much later time when the heat generation has sufficiently reduced. It is calculated that this large amount of heat generation would require that the fuel bundle transfer in an argon atmosphere of the refueling cell (the area about the core and refueling equipment) be made rapidly to prevent overheating, since sufficient surface area cannot be conveniently included in the fuel bundle transfer cup 41. The fuel removal device 42 therefore incorporates the natural convection cooling system (elements 46 and 48) which gives a greatly increased heat transfer capability. An auxiliary loop in heat exchange relation with exchanger 46 is filled with NaK (which is liquid at room temperature) and terminates at the lower end as the dip tube or tubes 48. Heat is transferred from the sodium in the fuel bundle transfer cup 41 to one or more NaK dip tubes 48. This NaK convects to the NaK-argon natural convection heat exchanger 46. A large amount of heat convection and radiation surface in the heat exchanger 46 transfers the heat to the argon of the refueling cell. By this method, one need not depend upon a rapid transfer to prevent gross overheating of the fuel bundle 12. The heat exchanger 46 is designed to accommodate a power failure to the fuel removal device 42 with the fuel bundle 12 in the refueling cell for an extended period of time.

By utilizing the fuel bundle transfer cups 41 as storage containers for the "spent" fuel bundles while they are stored in a decay tank, a separate handling operation is eliminated. Also, the temporary storage position in tank 40 for the fuel bundle transfer cup 41 is designed to provide guidance for the grapple 47 from a point above sodium level 44, in order to index on, and connect to, the fuel bundle transfer cup 41 via ledge 51 and lugs 50.

The refueling apparatus (refueling machine 11 and fuel removal device 42) described above and illustrated in FIGS. 1 and 2 satisfies all of the above stated requirements for refueling a core of a sodium-cooled fast reactor of the general type previously exemplified. A general outline of the refueling procedure is as follows, and assumes an argon-filled refueling cell above the reactor vessel 39, as commonly known in the art:

(1) Bring new fuel bundles, such as indicated at 12, into the refueling cell (area about the vessel 39 and refueling apparatus) through a suitable air lock, not shown but conventional in the art. These new fuel bundles are positioned in and handled by fuel transfer cups 41.

(2) Shut down reactor and lower temperature to about 400° F.

(3) Disconnect control rod drives, not shown, from control rods located in guide tubes 16.

(4) Remove reactor vessel shield plug, not shown, by lifting same vertically to a sufficient high not to interfere with refueling operations. This is done by apparatus conventionally utilized for this purpose and not constituting part of this invention.

(5) Transfer new fuel bundles positioned in transfer cups 41 by means of the fuel removal device 42, as described above, into the temporary storage tank 40 located around the periphery of the reactor core 13.

(6) Transfer one empty fuel bundle transfer cup 41 ing the one to be replaced as illustrated in FIG. 1. Accu- (7) Withdraw the fuel removal device 42 and move it aside.

(8) Move the refueling machine 11 over core 13 to a position directly above the fuel bundle 12 that is to be replaced. This is accomplished by appropriate movement of fuel transfer carriage 24 and tube carriage 22 as will be discussed in detail hereinafter.

(9) Lower the hexagonal refueling tube 10 by elements 19–21 until its lower surface rests upon the top of the wall channels or flats 14 of the six fuel bundles surrounding the one to be replaced as illustrated in FIG. 1. Accurate location of the tube 10 is provided by the handles 17 of three of the surrounding fuel bundles 12.

(10) Lower grapple 34 inside refueling tube 10 by elements 30–33 until it is in a position to be attached to the handle of the fuel bundle to be removed.

(11) Upon grapple 34 being lowered over the handle 17 of fuel bundle 12 such that the lugs 36 thereon are in alignment with cutouts 15 in tube 10, rotate the grapple 60° by rotating the grapple carriage assembly 30 in a counter-clockwise direction as indicated by arrow 38 whereby the lugs 36 which are normally located in three corners of tube 10 for rotation prevention are permitted to rotate in cutouts 15 to adjacent three corners of tube 10 and allow cutaway sections 37 of the grapple 34 to be engaged beneath the notches 18 of fuel bundle handles 17. It is seen that the cutouts 15 are located only at the level of the grapple at which the fuel bundle 12 is picked up. By this method, the fuel bundle cannot be accidently disconnected from any other position.

(12) Raise fuel bundle 12 within tube 10 by the grapple lifting prime mover 31 via pinion 32 and rack 33 until the fuel bundle is entirely within the refueling tube 10, but still under liquid sodium level 44. Note that the reaction load for lifting the fuel bundle 12 is taken on the wall channels 14 of the six adjacent fuel bundles, thus positively preventing them from also being lifted.

(13) Raise refueling tube by prime mover 21 via pinion 20 and rack 19 sufficiently to clear the adjacent fuel bundle handles 17 and in some instances the control rod guide tube 16.

(14) Transfer fuel bundle 12 horizontally to a position over the empty fuel bundle transfer cup 41 via opening 43 of tank 40, by actuating either or both of the carriages 22 and 24, depending on the location of the cup 41 with respect to the initial location in core 13 of fuel bundle 12, and lowering refueling tube 10 via elements 19–21 to the top surface of transfer cup 41.

(15) By actuating the grapple carriage assembly 30, lower fuel bundle 12 into the transfer cup 41 and disengage grapple 34 from fuel bundle handle 17 by reversing the rotation of the grapple as set forth above in step 11 and raising the grapple upwardly into tube 10 such that it clears the top of transfer cup 41.

(16) Raise the refueling tube 10 sufficiently to clear the top surface of cup 41 by actuating elements 19–21 and relocating the tube on the top surface of a transfer cup 41 containing a new fuel bundle (not shown) by proper actuation of carriages 22 and 24, as described in greater detail below.

(17) Lower the grapple 34 and engage same about the new fuel bundle in the same manner as described above in steps 10 and 11 with respect to the "spent" fuel element 12, and remove the new fuel bundle from the transfer cup and transfer same into the empty position in core 13 caused by the removal of the "spent" fuel element, for example, using similar steps to those set forth above in steps (12)–(15).

(18) Repeat operation steps (8)–(17) until all the new fuel bundles which are in temporary storage in tank 40 are replaced by used or "spent" fuel bundles 12.

(19) Raise the refueling tube 10 until its lower surface is above the floor level 28, and move same horiozntally out of the way.

(20) By means of the fuel removal device 42, lower the grapple 47 and dip tube 48 into a transfer cup 41 containing a used or "spent" fuel bundle and secure the grapple to the cup via cup ledge 51 and grapple lugs 50, as described above, and raise the fuel bundle in transfer cup 41, which is filled with sodium coolant, into the refueling cell above floor level 28 and transfer horizontally and lower into a sodium-filled decay tank, and disconnect the grapple 47 from the transfer cup, until all used or "spent" fuel bundles are transferred, etc.

(21) Repeat operational step (5) above if more new fuel bundle are to be transferred to the core 13 via temporary storage tank 40.

(22) Continue the appropriate above described operational steps until all new fuel bundles are transferred into the core and the used or "spent" fuel bundles are transferred into the decay tank, and move the fuel removal device 42 and the refueling machine 11 out of the way of the vertically suspended reactor shield plug.

(23) Lower the shield plug to operating position.

(24) Reconnect the control rod drives to the control rods in guide tubes 16.

(25) Operate the reactor.

The refueling machine 11 which accomplishes the previously described operation has the following five motions:

(1) Horizontal motion of the fuel transfer carriage 24 (left-right motion as indicated by double-arrow 27 in FIG. 2). As pointed out above the guiding and driving apparatus for carriage 24 may be, for example, a conventional track and lead screw assembly.

(2) Horizontal motion of the tube carriage 22 along the track assembly 25 mounted on the end of fuel transfer carriage 24, perpendicular to the motion of carriage 24 (into and out of the paper as shown in FIG. 2). These two motions permit location above any specific point in the reactor vessel 39, and is of sufficient precision to permit final indexing of the refueling tube 10 by the fuel bundle handles 17.

(3) Vertical motion of the refueling tube 10, produced by prime mover 21 via rack 19 and pinion 20. However, the tube 10 could be guided, for instance, by rolling wheels and lifted by two oppositely located racks and pinions to provide a balanced lift. While the lift is sufficient to raise the refueling tube 10 above the floor level 28, during fuel transfer the vertical lift of tube 10 is only high enough to clear the tops of the fuel bundle handles 17.

(4) Vertical motion of the grapple 34, as indicated by the double-arrow 35 in FIG. 2, produced by the prime mover 31 via pinion 32 and rack 33 of grapple carriage assembly 30.

(5) Rotation of the grapple 34, as indicated by the arrow 38 in FIG. 2, produced by about a 60° rotatiton of the grapple carriage assembly 30 relative to the refueling tube 10. Rotation of grapple 34 is prevented except when in the down position and lugs 36 thereof align with cutouts 15 in refueling tube 10, as previously described.

While the above invention has been specifically described with respect to the use of liquid sodium as the coolant, the novel refueling apparatus and method will operate effectively with other types of coolants compatible with the type of reactor utilized.

It is thus seen that the present invention greatly advances the state of the art by providing a novel refueling apparatus and method which utilizes a temporary fuel transfer storage facility and transfer cups whereby the fuel bundles or elements are removed from the reactor core and transferred into an external decay tank in a manner which permits continuous removal of large amounts of decay heat by maintaining the bundles immersed in coolant throughout the transfer operation.

While a specific embodiment of the invention has been illustrated and described, modifications and changes will become apparent to those skilled in the art, and it is intended to cover in the appended claims all such modifications and changes as come within the spirit and scope of the invention.

I claim:

1. In combination, a nuclear reactor and a refueling machine for the nuclear reactor, said refueling machine comprising: a first carriage means adapted to be moved in a first horizontal direction, a second carriage means secured to one end of said first carriage means and adapted to be moved in a second horizontal direction, said second horizontal direction being substantially perpendicular to said first horizontal direction, a refueling tube means movably supported by said second carriage means, means for moving said refueling tube means in a vertical direction substantially perpendicular to said first and second horizontal direction, grapple means movably positioned in said refueling tube means, means mounted on one end of said refueling tube means for raising and lowering said grapple means, and means for rotating said grapple means with respect to said refueling tube means, said nuclear reactor including a vessel containing a coolant, a core surrounded by said coolant, said core containing a multitude of fuel bundles, temporary open-end storage tank means positioned intermediate said core and said vessel, fuel bundle transfer cup means removably positioned in said tank means, said tank being provided with at least one opening on the side thereof facing said core, said opening extending downwardly from said tank means open end to a point sufficient to allow said fuel bundles to be moved therethrough while immersed in said coolant for positioning thereof in said cup means, said fuel bundles including handle means at least on the upper end thereof when positioned in said core, said fuel bundle handle means being configured to guide said refueling tube means of said refueling machine around one of said fuel bundles when said tube means is lowered thereabout, said refueling tube means having a larger internal cross-section than the external cross-section of said fuel bundles and being configured to contact and rest upon adjacent fuel bundles when lowered over said one of said fuel bundles maintaining adjacent bundles in place, whereby upon lowering said tube means so as to contact and rest upon adjacent bundles and upon lowering said grapple means over said one fuel bundle handle means and rotating same, said grapple means engages said fuel bundle handle means for raising said fuel bundle into said refueling tube means, while maintaining adjacent fuel bundles in place, and transferring same into said transfer cup means located in said temporary storage tank means while maintaining said fuel bundle immersed in said coolant.

2. The combination defined in claim 2, wherein said fuel bundles and said refueling tube means are of a hexagonal cross-sectional configuration, said refueling tube means being provided with at least one cutout in the side surface thereof, and wherein said grapple means is provided with at least one outwardly projecting lug, said lug being located on said grapple means such that when said grapple means is positioned over said fuel bundle handle means said lug is in alignment with said refueling tube means cutout, whereby upon alignment of said lug and said cutout said grapple means is allowed to be partially rotated within said refueling tube means for engaging said fuel bundle handle means.

3. The combination defined in claim 2, wherein said fuel bundle additionally includes an upwardly extending control rod guide tube, said fuel bundle handle means being incorporated into said guide tube, and wherein said grapple means includes a recessed area therein at least sufficient to encompass a portion of said guide tube extending above said fuel bundle handle means when said grapple means is positioned thereover.

4. The combination defined in claim 1, additionally including fuel removal means for transferring said fuel bundle transfer cup means to and from said temporary storage tank means, said fuel removal means including a support member, a second grapple means mounted at one end of said member, heat exchanger means mounted on said member in spaced relationship with respect to said second grapple means, and cooling dip tube means extending from said grapple and adapted to extend into said transfer cup means and around said fuel bundle when located in said transfer cup means, said cooling dip tube means being in heat exchange relationship with said heat exchanger means, said second grapple means including at least one protruding lug means adapted to engage a ledge-like portion of said transfer cup means for transferring said transfer cup means to and from said temporary storage tank means, and means attached to said support member for moving same.

5. The combination defined in claim 4, wherein said coolant is liquid sodium, said cooling dip tube means contains sodium-potassium, and said heat exchanger means is of the convection sodium-potassium-argon type.

6. The method of refueling a nuclear reactor which permits continuous removal of large amounts of decay heat comprising the steps of: transferring by a refueling apparatus, fuel transfer cups containing fuel bundles into temporary storage positions at the periphery of the core; transferring an empty fuel transfer cup into a temporary storage position; moving the refueling apparatus over the reactor core to a position directly above the fuel bundle that is to be replaced; lowering the refueling tube over the fuel bundle to be replaced until its lower surface rests upon the top of the adjacent fuel bundles for maintaining same in place; lowering the grapple inside the refueling tube until it is in a position to attach to the fuel bundle; partially rotating the grapple to engage the fuel bundle for lifting same; raising the fuel bundle within the refueling tube until it is entirely within the refueling tube but still immersed in coolant; raising the refueling tube sufficiently to clear the adjacent fuel bundles while maintaining the raised fuel bundle immersed in coolant; transferring the fuel bundle horizontally to a position over the empty fuel transfer cup; lowering the refueling tube to the top surface of the transfer cup; lowering the fuel bundle into the transfer cup; repositioning the refueling tube over a transfer cup containing a new fuel bundle, removing the new fuel bundle from the transfer cup and transferring same, while immersed in coolant, to the empty position in the core; lowering the new fuel bundle into position in the core; raising the transfer cup containing the used fuel bundle which is surrounded by coolant; transferring the transfer cup to a decay tank external of the reactor core; and disconnecting the refueling apparatus therefrom.

7. The method defined in claim 6, additionally including the step of: cooling the coolant in the fuel transfer cup during the transfer thereof from the temporary storage position to the decay tank for preventing overheating of the fuel bundle therein.

References Cited

UNITED STATES PATENTS

| | | | |
|---|---|---|---|
| 2,756,858 | 7/1956 | Kasschau | 176—31 |
| 2,794,562 | 6/1957 | Anderson | 214—18CNR |
| 3,190,805 | 6/1965 | Straub et al. | 176—30 |
| 3,421,635 | 1/1969 | Bunger | 294—86AX |
| 3,428,522 | 2/1969 | Müller | 176—31 |

FOREIGN PATENTS

| | | | |
|---|---|---|---|
| 1,105,502 | 3/1968 | Great Britain | 176—30 |

CARL D. QUARFORTH, Primary Examiner

E. E. LEHMANN, Assistant Examiner

U.S. Cl. X.R.

176—30, 78; 214—18CNR